United States Patent

[11] 3,544,785

| [72] | Inventor | William A. Weibel<br>Chicago, Illinois |
|---|---|---|
| [21] | Appl. No. | 758,849 |
| [22] | Filed | Sept. 10, 1968 |
| [45] | Patented | Dec. 1, 1970 |
| [73] | Assignee | Joslyn Mfg. and Supply Co.<br>Chicago, Illinois<br>a corporation of Illinois |

[54] LUMINAIRE
12 Claims, 12 Drawing Figs.

[52] U.S. Cl. .................................................. 240/25,
240/3, 240/11.4, 240/106
[51] Int. Cl. ...................................................... F21s 3/00
[50] Field of Search .......................................... 240/3, 11.4,
25, 27, 28, 34, 51.11, 93, 106, 108, 10

[56] References Cited
UNITED STATES PATENTS

| 1,759,093 | 5/1930 | Clawson ........................ | 240/108 |
| 2,574,886 | 11/1951 | Phillips ........................ | 240/3 |
| 3,141,620 | 7/1964 | Guggemos ..................... | 240/3 |
| 3,288,989 | 11/1966 | Cooper ........................ | 240/11.4 |
| 3,371,201 | 2/1968 | Yonkers ........................ | 240/3 |

FOREIGN PATENTS

| 767,952 | 2/1957 | Great Britain ............... | 240/106 |
| 1,276,796 | 10/1961 | France ......................... | 240/106 |

*Primary Examiner*—John M. Horan
*Assistant Examiner*—Richard M. Sheer
*Attorney*—Mason, Kolehmainen, Rathburn & Wyss ABSTRACT: A luminaire comprising an elongated, tubular, substantially cylindrical light refractor formed of transparent molded plastic material and including at least one pair of identical mating members of semicircular cross section, each member including first and second opposite, longitudinally extending edges confronting the second and first edges, respectively, on the other member when the members are secured together to form the cylindrical refractor. A plurality of recesses are formed along the first edge of each member and a corresponding plurality of protruding tonguelike projections are formed on the second edge of the member so that when the members are assembled together the tonguelike projections extend into the recesses to interlock the members tightly together against relative vertical displacement. Opposite ends of the refractor are provided with annular recesses so that any number of refractors may be assembled and secured together in end-to-end relation.

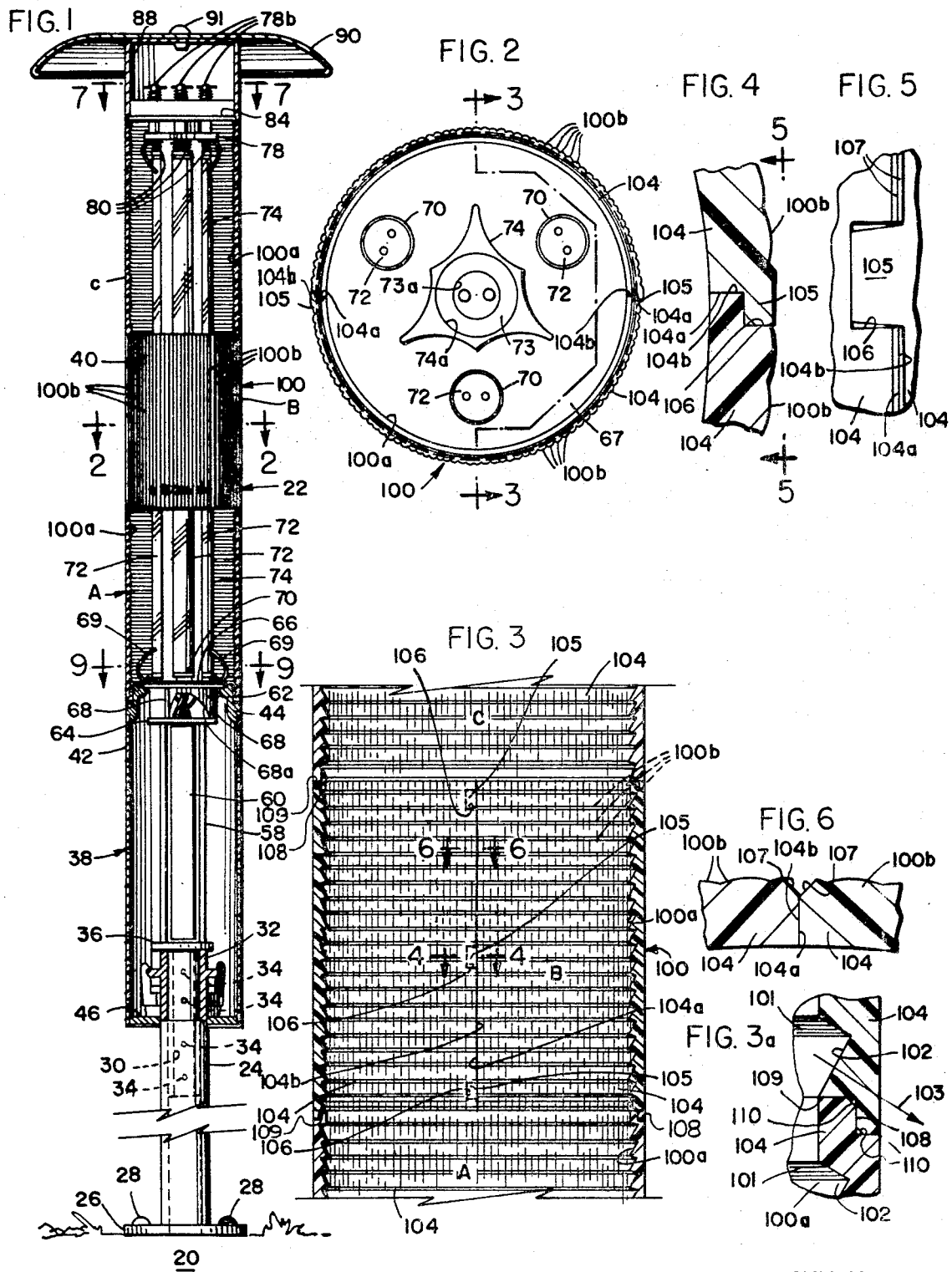

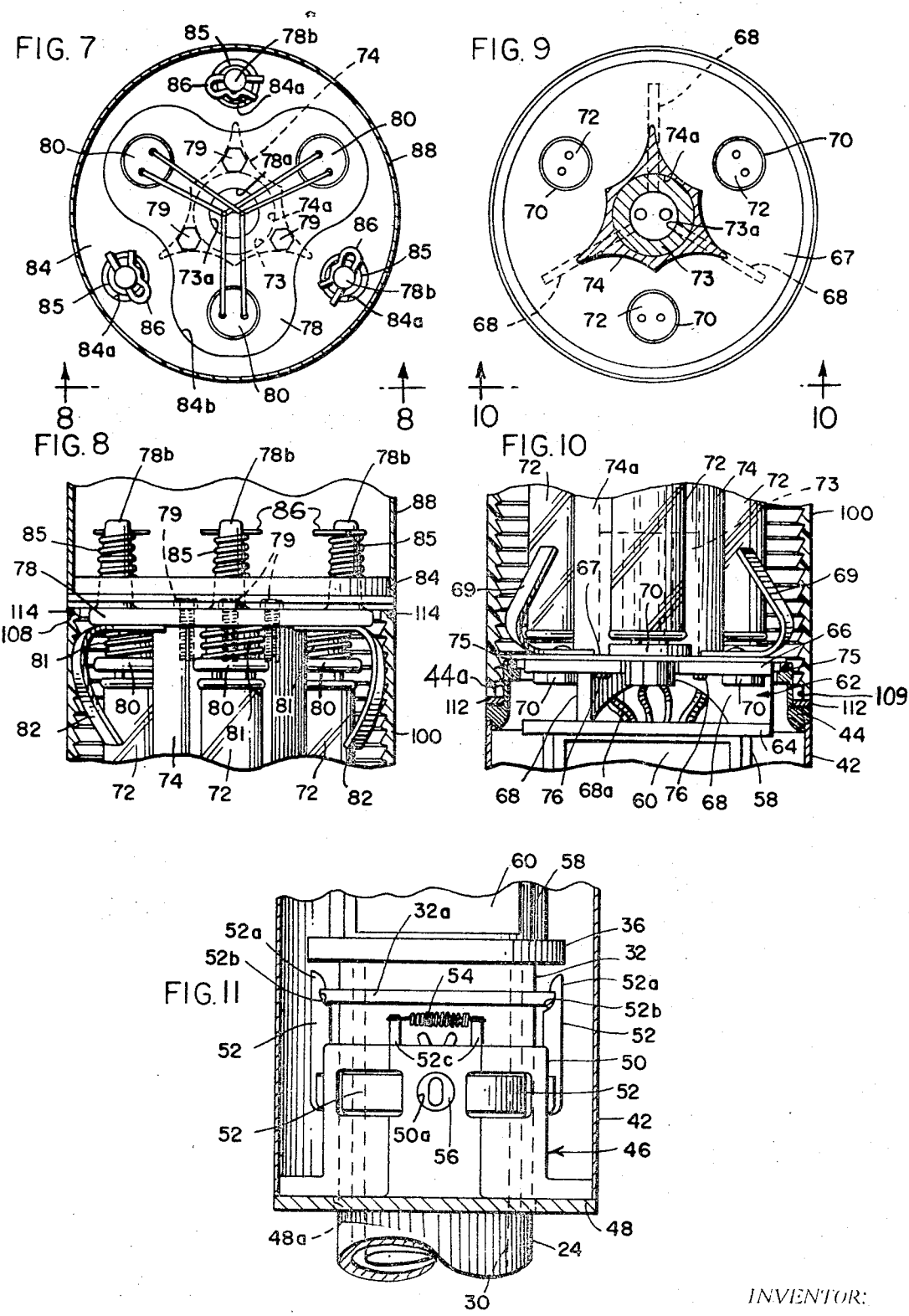

LUMINAIRE

The present invention relates to luminaires and, more specifically, to lighting luminaires suitable for outdoor lighting applications, such as street lighting and other areas wherein people congregate and lighting is required.

The present invention is an improvement on U.S. Pat. No. 3,371,201, which patent is assigned to the same assignee as the present invention.

One of the problems associated with luminaires of the type disclosed in the aforementioned patent is that of fabricating an elongated, hollow, tubular refractor on an economical basis. Because the inside surface of the refractor is formed with annular grooves to provide the proper light distribution pattern and because the outside surface includes longitudinal flutes or ridges and grooves, attempts to manufacture the refractors from commercially available, clear, plastic tube stock or pipe have been unsuccessful because of the high machining costs involved in machining the internal grooves, not to mention the costs in forming the longitudinal flutes on the outside surface of the refractor.

Accordingly, it is desirable and an object of the present invention to form the refractors in an injection molding process wherein the internal and external surfaces are properly shaped and finished in the molding operation so that further machining or surface finishing is not required. It is expensive to form long, hollow, tubular objects in a molding process because of the high cost of a mold suitable to produce the intricate shape on the interior surface of the refractor that is required.

It is desirable and an object of the present invention to form an elongated tubular refractor of the type disclosed herein using pairs of matching, identical members having the requisite internal grooves and external flutes molded thereon, which members are semicircular in transverse cross section and are then assembled together to form cylindrical sections. Moreover, because the length of the tubular refractors varies with different lighting installations and applications, it is desirable and an object of the invention to provide pairs of semicylindrical members in standard, shorter, modular lengths so that assembled pairs may be joined together in end-to-end relation to provide the desired length of refractor required.

As an example, semicircular, tubular members 2 feet in length can be assembled together in end-to-end relation for producing elongated, tubular refractors in 2-, 4-, 6-, 8-, and even 10-foot lengths, if desired.

In order to further reduce costs and, in accordance with another object of the present invention, it is desirable that each semicircularly cross sectioned member used in making up a refractor be identical so that there is little possibility of improperly assembling or interconnecting the members when making up the cylindrical tubular sections of the refractor. Moreover, it is desirable that such members be identical so that cylindrical sections of the refractor can be readily joined together in end-to-end relation.

Another object of the present invention is to provide means for permanently and positively securing and sealing together each pair of semicircular members making up each section of the tubular refractor so that no air leakage or water leakage can occur along the joined edges or seams.

Similarly, it is an object of the invention to provide a new and improved means for joining the cylindrical refractor sections in end-to-end relation in a manner providing a tightly sealed joint so that air and other foreign material, such as dust, is excluded from the interior of the refractor when the luminaire is in operation in the field.

Yet another object of the present invention is to provide a new and improved tubular refractor of the character described which is readily sealed at opposite ends to provide for expansion and contraction during changes in temperature and yet provide positive sealing all the while for preventing air, dust, and other contaminants from penetrating to the interior of the tubular refractor.

The foregoing and other objects and advantages of the present invention are accomplished in an illustrated embodiment comprising an outdoor lighting luminaire having an elongated, tubular, substantially cylindrical light refractor formed of transparent molded plastic material including at least one pair of identical, matching members of a substantially hollow semicylindrical cross section. Each member includes a first and second, opposite, longitudinally extending edge in confronting relation with and secured to the second and first edges, respectively, of the other member when the members are joined together to form a hollow, cylindrical segment of the refractor. Recess defining means are formed along a first edge of each member and a protruding tonguelike projection is formed on the second edge thereof so that when the members are assembled together the tongues on one member project into the adjacent recesses on the opposite member, thereby interlocking the members together against relative vertical displacement. Opposite ends of each cylindrical section are provided with annular recesses for use in joining a number of sections together in end-to-end relation to form an elongated luminaire of the desired length.

The foregoing and other objects and advantages of the present invention are better understood by reference to the following detailed description and claims when taken in conjunction with the drawings, in which:

FIG. 1 is a side elevational view with portions in section illustrating a new and improved luminaire in accordance with the features of the present invention;

FIG. 2 is a horizontal sectional view through the luminaire refractor taken substantially along lines 2–2 of FIG. 1;

FIG. 3 is a vertical sectional view taken substantially along lines 3–3 of FIG. 2;

FIG. 3a is an enlarged, fragmentary, sectional view showing the lower end portion of one cylindrical section joined to the upper end of another cylindrical section of the refractor;

FIG. 4 is a fragmentary, horizontal sectional view taken substantially along lines 4–4 of FIG. 3;

FIG. 5 is a fragmentary, side elevational view looking in the direction of arrows 5–5 of FIG. 4;

FIG. 6 is a fragmentary, horizontal, sectional view taken substantially along lines 6–6 of FIG. 3;

FIG. 7 is a horizontal, sectional view taken along the upper end portion of the luminaire substantially along lines 7–7 in FIG. 1;

FIG. 8 is a side elevational view with portions of the refractor broken away and in section looking in the direction of the arrows 8–8 in FIG. 7;

FIG. 9 is a horizontal, cross-sectional view through the luminaire at a midpoint thereon, taken substantially along the lines 9–9 of FIG. 1;

FIG. 10 is a side elevational view with portions of the luminaire refractor broken away and looking in the direction of arrows 10–10 of FIG. 9; and FIG. 11 is an enlarged side elevational view with portions broken away and in section illustrating the lower end portion of the refractor support housing and the connecting means engaging the support pole or post.

Referring now more particularly to the drawings and specifically to FIG. 1, therein is illustrated a new and improved street or outdoor lighting luminaire of the vertical type constructed in accordance with the present invention and referred to generally by the reference numeral 20. The luminaire 20 includes the luminaire assembly 22 which is mounted at the upper end of an upstanding support post 24 having a base plate 26 secured to a suitable footing by mounting bolts 28.

In order to connect the luminaire assembly 22 to the upper end of the support post 24, a short, tubular connecting member 30 (FIGS. 1 and 11) is telescopically engaged in the upper end of the support post and extends upwardly therefrom to seat within the bore of a tubular base collar 32 at the lower end of the luminaire assembly. Setscrews 34 are provided to connect the support post 24 and the tubular collar base 32 to the connecting member 30, and an annular base plate 36 is secured to the upper end of the collar 32, as best shown in FIG. 11, to support the internal components of the luminaire assembly.

The luminaire assembly 22 includes a lower housing section 38 enclosing a ballast and starting circuit for the lights and an upper lighting section 40 joined in end-to-end relation. The entire luminaire assembly 22 is slidable vertically on the pole 24 between the upper position shown in FIG. 1 and a lowered position, so that fluorescent tubes or lights within the upper section 40 can be easily serviced and/or replaced.

The lower housing 38 is enclosed by a cylindrical, outer shell 42 and an annular connecter ring 44 is mounted adjacent the upper end of the shell for connecting the lower housing section 38 with the lower end of the light-enclosing upper section 40. At the lower end of the shell 42, the lower housing section is provided with an annular base member 46 having a bottom wall 48 with a central opening 48a therein for the support post 24. The base portion 46 includes a substantially cylindrical ring portion 50 extending upwardly of the base plate 48 and telescoped over the collar base 32. A pair of clamping shoe members 52 are disposed within the ring portion 50, each including a semicylindrical braking surface adapted to bear against the collar base 32 and pole 24 to prevent downward movement thereof. The shoes 52 include upstanding arms 52a which are diametrically disposed on opposite sides of the base portion 50, and each arm is formed with a slot or notch 52b which is adapted to engage an annular lip or retaining ring 32a formed on the outside surface collar base 32 beneath the circular baseplate 36 to hold the luminaire assembly 22 locked in its upper position at the upper end of the pole (FIG. 1). Each shoe member 52 includes a pair of upstanding legs 52c (FIG. 11), and these legs are interconnected by tension springs 54 which normally hold the braking surfaces of the shoes tightly engaged against the cylindrical surface of the collar base 32 and/or pole 24, thus clamping the luminaire assembly 22 in any selected vertical position on the post or collar 32. The ring portion 50 is formed with a keyhole 50a in alinement with a similar hole in the shell 42 and a lock mechanism 56 is seated for rotation in the ring and may be turned with a suitable tool of key. When a key or tool is inserted into the lock and turned, the spring 54 is overpowered and permits the shoes 52 to move away from one another and out of clamping engagement against the surface of the collar 32 or pole 24, thus permitting the luminaire assembly to slide vertically up and down on the pole. When the key is returned to the normal position and removed from the lock mechanism 56, the springs 54 again bias the shoes 52 inwardly against the pole 24 to clamp and hold the luminaire assembly against vertical movement. Should a workman, while working on the luminaire assembly, slip or fall or otherwise release pressure on the key or disengage the key from the lock mechanism 56, the luminaire assembly will be held in a fixed position on the pole and will not slip or slide downwardly toward the ground. When the luminaire assembly 22 is moved to its upper or normal operating position (FIG. 1), the notches 52b on the arms 52a are engaged by the retaining ring 32a to positively lock and hold the luminaire in place.

It will thus be seen that the entire luminaire assembly 22 can be bodily lowered on the pole 24 from the upper position of FIG. 1 to a convenient lower position wherein servicing of the unit is simplified. After servicing is completed, the luminaire assembly is then moved upwardly to the normal position shown and locked into place by engagement of the notches 52b on the arms 52a with the retaining ring 32a on the collar 32, as shown in FIG. 11.

Within the lower housing section 38 is provided an upstanding, channel-shaped, vertical support member 58 for housing a ballast and started mechanism 60 for energizing the lights of the luminaire. At the upper end of the channel-shaped support member is provided a mounting base 62 including a pair of spaced-apart, centrally apertured, horizontal, circular plates 64 and 66. The plates 64 and 66 are maintained in vertically spaced relation by a plurality of vertical, radially extending ribs 68 which are cut away on the inside lower corners (FIGS. 1 and 10) as at 68a to permit the wiring from the ballast and starting assembly 60 to pass upwardly into the upper housing section 42.

As best shown in FIGS. 9 and 10, the upper plate 66 is provided with a plurality of circular openings therein spaced outwardly from the center for accommodating lower sockets 70 for the lower ends of a plurality of upstanding fluorescent tubes 72 disposed in vertical, parallel arrangement and spaced radially and equilaterally outward of the central vertical axis of the luminaire, as best shown in FIGS. 2, 7, and 9. An upstanding reflector unit, preferably formed of extruded metal and having polished, concave, outer surfaces 74, is seated on the circular plate 66 and extends upwardly therefrom. The reflector 74 is held in place by a plurality of cap screws 76 (FIG. 10) and is provided with a central hollow bore 74a to accommodate wiring for the upper ends of the fluorescent tubes 72.

The reflector 74 is generally triangular in shape as shown in FIGS. 2, 7, and 9, and includes a plurality of concave reflective surfaces disposed directly opposite the adjacent inside surface of the respective fluorescent tubes to reflect the inwardly directed light rays therefrom outwardly through the tubular refractor, as more fully explained in the aforementioned U.S. Pat. No. 3,371,201. On the upper surface of the circular plate 66 is mounted a thin, circular disk 67 having a diameter slightly larger than the diameter of the plate 66, and in order to guide the upper portion of the luminaire section 40 during vertical movement on the pole, a plurality of spring guide fingers 69 is attached to the circular plate 67 to maintain the refractor in general coaxial alinement with the vertical axis of the luminaire during vertical movement.

When the luminaire assembly 22 is locked in the upper or operating position of FIG. 1, sealing is provided between an upper end of the connecter ring 44 and the circular plate 67 by means of a sealing gasket 75 (FIG. 10) which is seated in an annular recess formed in the connecter ring and the seal is in tight contact against the lower surface around the perimeter of the disk 67. The lower edge of the connecter ring 44 is joined to the upper end of the tubular shell 42, as best shown in FIG. 10, so that the lower section 38 is sealed from the upper section 40 except for the central passages in the base unit 62 for the wires. The lower end portion of the vertically disposed reflector 74 is maintained in coaxial alinement on the circular plate 66 by a short, hollow, cylindrical tube 73 which extends upwardly into the bore 74a of the reflector, as best shown in FIGS. 2, 9, and 10. The connecter tube 73 is attached to the circular plate 66 and provides ample support for maintaining the reflector 74 accurately centered on the base assembly 62 and is formed with a central, axial bore 73a for the wires leading to the upper ends of the fluorescent tubes 72. This wiring is shown in FIGS. 2 and 9 and extends upwardly through the bore 74a of the reflector to the upper end of the upper luminaire section 40.

At the upper end of the reflector 74 is provided a circular plate 78 having a central opening 78a in concentric alinement with the bore 74a of the reflector to accommodate the wiring for the upper ends of the fluorescent tubes. As best shown in FIGS. 7 and 8, the circular plate 78 is connected to the upper end of the reflector 74 by a plurality of downwardly extending cap screws 79 which are threaded into radially spaced, threaded bores provided in the reflector. The plate 78 is formed with a plurality of equilaterally spaced, circular openings radially outwardly of the central opening 78a for supporting upper sockets 80 for the upper ends of the fluorescent tube 72. The sockets 80 are spring biased downwardly of the plate 78 by concentric socket springs 81, and the sockets are movable vertically so that insertion of the tubes 72 into place between the upper and lower sockets is readily accomplished.

A plurality of springlike guide fingers 82 similar to the fingers 69 are mounted to extend downwardly from the plate 78 for guiding the upper section 40 of the luminaire in general coaxial alinement with the pole as the upper end of the refractor is moved upwardly into place against the plate. Installation of the fluorescent tubes 72 is accomplished by engaging the terminal pins on the upper ends of the tubes within the female recesses in the upper sockets 80 and biasing the sockets upwardly to compress the springs 81 until the terminal pins at the lower end of the fluorescent tubes can be alined with the female receptacles in the base socket 70. The tubes are then released and the biasing springs 81 force the upper sockets 80 downwardly, maintaining the tubes 72 in tight electrical connection between the upper and lower ends and supplying the desired current for operating the fluorescent lights.

The baseplate 78 is formed with a plurality of radially spaced, upwardly extending, tapered pins 78b which project upwardly through circular openings 84a formed in a floating cap plate 84 provided at the upper end of the luminaire's upper section 40. A compression spring 85 is mounted on each of the pins 78b to bias the floating cap member 84 downwardly towards the circular upper plate 78, and suitable hairpinlike retainers 86 are inserted through the pins 78b adjacent the upper ends to retain the upper ends of the compression springs 85 on the respective pins.

From the foregoing, it will be seen that the plate member 84 floats relative to the circular plate 78 which is fixedly connected to the upper end of the central reflector 74. The floating plate 84 serves as the base for an inverted, cuplike cap member 88 secured around its lower edge in a recess provided around the outer edge of the plate, as best shown in FIG. 8 and, if desired, an enlarged, concave, circular shade 90 is mounted on the upper end of the cap member, as shown in FIG. 1, and is attached by one or more rivets or bolts 91. The floating base 84 of the cap structure is formed with an enlarged star-shaped opening 84b (FIG. 7) to freely accommodate the upper end portions of the sockets 80 and the wiring, which extends outwardly to the sockets from the circular opening 78a in the member 78.

In accordance with the present invention, the upper section 40 of the luminaire 20 includes an elongated, tubular, cylindrical refractor 100 which is constructed of integrally molded, transparent or clear plastic material. As described more fully in the aforementioned U.S. Pat. No. 3,371,201, the tubular refractor 100 is provided with an internal surface having a plurality of vertically spaced annular grooves 100a therein. Each groove 100a is v-shaped in cross section and, as best shown in FIG. 3a, includes an upwardly and inwardly sloping frustoconical upper surface 101 having an inclination of about 10 degrees relative to the horizontal and a downwardly and inwardly sloping frustoconical lower surface 102 inclined at about 55° above the horizontal. Light passing through the wall of the refractor 100 is thus directed outwardly at an angle of about 15° downwardly from the horizontal, as indicated by the arrow 103 in FIG. 3a and as described in U.S. Pat. No. 3,371,201. As best shown in FIGS. 1, 2, and 3, the outer surface of the tubular refractor 100 is formed with a plurality of vertically extending, radially spaced, convex flutes 100b which serve to further diffuse the light passing outwardly from the refractor.

In accordance with the invention, the elongated, tubular refractor 100 is fabricated from a plurality of individual cylindrical sections A, B, and c (FIG. 1), which are joined in end-to-end relation to provide the desired length of refractor required for a specific lighting installation. Each of the refractor sections A, B, and C making up the refractor 100 is formed from a pair of identical halves 104 of hollow, substantially semicylindrical shape. Preferably, the refractor halves 104 are molded from clear, transparent or partially transluscent acrylic plastic material in an injection molding process, and the interior and exterior surfaces thereof, making up the grooves 100a and flutes 100b, are sufficiently smooth after removal from the old, so that no further machining or finishing operation is required. In an embodiment constructed in accordance with the invention, the refractor 100 was approximately 6½ inches in diameter and the cylindrical sections A, B, and C were constructed to be approximately 24 inches or 2 feet long.

From the foregoing, it can be seen that even though the complete refractor 100 may be 2, 4, 6, 8, 10, or more feet in length the individual halves 104 used in making up the refractor are relatively small in size and can be easily accommodated on standard or commercially available injection molding machines without requiring modifications or enlarged machines because of size requirements. The half members 104, used in pairs for making up a cylindrical section A, B, or C of the refractor 100 are identical and are designed so that they cannot be securely assembled together in an incorrect manner. In addition, it is nearly impossible for a workman to incorrectly fit or assemble completed sections together when making up a refractor of a given length requiring several sections.

In accordance with this purpose, the lower ends of each half member 104 are provided with the appropriate word "down" and arrows, as indicated in FIG. 1, on the exterior surface at the lower end. Each semicylindrical half member 104 is formed with a pair of opposite, radially disposed longitudinally extending side edges 104a and 104b, respectively, which are adapted to confront and be secured to respective edges 104b and 104a of the adjacent half member 104, making up a complete cylindrical section A, B, C, etc. In order to interlock the confronting individual half members 104 in each section and prevent longitudinal movement displacement therebetween, the edges 104a are provided with a plurality of outwardly extending tonguelike projections 105, as best shown in FIGS. 2 through 5. The projections 105 on the longitudinal edge surfaces 104a are adapted to project into and seat in appropriately located recesses 106, longitudinally spaced on the opposite longitudinal edge surfaces 104b. As best shown in FIGS. 3, 4, and 5, the tongues 105 are tapered slightly to fit easily within the rectangular recesses 106 and firmly interlock the two half members together. As best shown in FIGS. 5 and 6, each of the members 104 is provided with inwardly extending, beveled surfaces 107 along the outer corner edge of the longitudinal edge surfaces 104a and 104b so that when each pair of members 104 is assembled together with the projections or tongues 105 seated in the recesses 106, a V-shaped groove is formed along the vertical junction of the confronting pairs of edge surfaces 104a and 104b. After a pair of half members 104 are assembled together and held in place, liquid solvent or bonding agent suitable for the type of plastic material used is dispensed into the groove with an eye dropper or similar dispenser. The solvent is retained in the groove and gradually flows downwardly between the confronting surfaces 104a and 104b momentarily dissolving the plastic material of the half members and subsequently forming a tight, strong, sealed bonding between the half members. The trough or groove formed by the beveled surfaces 107 channels the liquid solvent to flow uniformly and evenly along the seam and prevents the liquid from spreading onto the outer surface of the refractor.

After each pair of half members 104 have been assembled and bonded together, as described, to form the short cylindrical sections A, B, and C, etc., a number of sections are then bonded together in end-to-end relation to form the completed, elongated, tubular refractor 100 of the desired length. For this purpose, and to prevent incorrect end-to-end assembly each half member 104 is formed with an external groove or recess 108 around the outer periphery of the upper end and an internal groove 109 is formed at the lower end, however, on the interior periphery thereof.

A pair of cylindrical sections A, B, and C, etc., are then assembled in end-to-end relation with the inner and outer grooves at the lower and upper ends thereof, respectively, seated together as shown in FIG. 3a. Solvent material is applied on the end surfaces of the sections to fuse and bond the seams or joints together. The external corners of the upper and lower tongue-and-groove-forming end portions of the half members 104 are beveled as at 110 to facilitate assembly and to provide a V-shaped trough for holding the bonding solvent which is applied, as previously described.

It should be understood that any appropriate number of sections A, B, C, etc., may be joined together in end-to-end relation to make up the refractor 100 to the desired length for accommodating the lengths of fluorescent tube 72 which are to be used in the luminaire installation. When the individual, semicylindrical half members 104 of the refractor have been assembled together into sections and the sections have been joined and bonded with solvent as described, the completed refractor structure 100 is sealed and is impervious to the penetration of moisture, dust, and other foreign matter. Referring momentarily to FIGS. 8 and 10, the lower end of the completed tubular refractor 100 is supported on the connecter ring 44 at the upper end of the lower luminaire section 38 and a suitable sealing gasket 112 is provided to seal the lower end of the light chamber formed by the refractor against the entry of moisture or other contaminants. The lower end portion of the refractor 100 is seated in an annular recess 44a formed on the connecter ring 44 and rests on the resilient gasket 112, and when the lower section 38 of the luminaire assembly is lowered on the pole 24, as previously described, the refractor 100 is lowered therewith and the fluorescent tubes 72 are then exposed for service or replacement. The upper end of the refractor 100 is sealed against the floating cap plate 84 by an annular resilient sealing gasket 114 (FIG. 8) seated within the external annular recess 108 formed at the upper end of the uppermost refractor section C. The springs 85 normally bias the cap structure and cap plate 84 downwardly against the gasket 114, thereby insuring a tight seal around the upper end of the tubular refractor 100. During operation of the unit, as the temperature increases or decreases, the length of the tubular refractor and the length of the reflector 74 will change somewhat and the springs 85 accommodate this change freely, yet maintain a tight seal at both ends of the refractor 100, even though wide temperature variations are encountered.

From the foregoing, it will be seen that the luminaire of the present invention provides many advantages over prior art luminaires. The refractor 100 is constructed of pairs of readily available, economical, molded plastic, semicylindrical half members 104 which are then joined together to form the cylindrical sections, any number of which can be joined in end-to-end relation to form a refractor of the desired length. By using a number of smaller, identical, molded half members to make up a large refractor, costs are reduced significantly because the molded half members can be economically formed on conventional equipment used for the injection molding of plastic material. The luminaire of the invention provides tight sealing around both upper and lower ends of the refractor to prevent the entry of moisture, dust, and other foreign matter. Moreover, the refractor 100 and the supporting lower luminaire sections 38 are easily lowered on the pole so that the neon or fluorescent tubes 72 are directly exposed for easy replacement or service. The braking and clamping arrangement housed at the lower end of the lower luminaire section 38 provides means for positive locking of the luminaire sections in operating position at the upper end of the pole and provides a deadman type of control which prevents the unit from slipping downwardly, once it is unlocked should the key in the lock 56 become inadvertently disengaged.

Although the present invention has been described by reference to a single embodiment thereof, it will be apparent that numerous other modifications and embodiments will be devised by those skilled in the art which will fall within the true spirit and scope of the present invention.

I claim:

1. An outdoor lighting luminaire comprising an elongated, tubular, substantially cylindrical light refractor formed of transparent molded plastic material including at least one pair of identical half members of substantially hollow, semicylindrical cross section, each member including first and second opposite, longitudinally extending edges confronting second and first edges, respectively, on the other member when said members are assembled together to form said cylindrical refractor, recess defining means formed on the first edge and a protruding tonguelike projection formed on the second edge of each member, said tonguelike projection extending into said recess means on said identical half member to interlock said members together against relative vertical displacement when said members are ad assembled together with said edges thereof in confronting contact, and a pair of annular recesses defined at opposite ends of said refractor for receiving sealing means for sealing opposite ends of said refractor.

2. The luminaire of claim 1 wherein said tonguelike projections are tapered from a maximum cross section adjacent said first edge to a minimum cross section adjacent the outer end of the projection, said recess means being of substantially uniform cross section substantially equal to the maximum cross section of said tonguelike projections.

3. The luminaire of claim 1 wherein the internal surface of each member is formed with a plurality of integrally molded, alternate, horizontal ridges and grooves, each ridge and groove having upper and lower surfaces angularly intersecting one another and conforming in shape to a segment of a frustoconical surface.

4. The luminaire of claim 2 wherein the outer surface of each member is formed with a plurality of integrally molded, alternate, vertically extending ridges and grooves, each ridge having a convex outer surface conforming to a segment of a cylindrical surface and angularly intersecting the outer surface of an adjacent ridge.

5. The luminaire of claim 1 wherein each half member is formed with an inwardly beveled surface along the outer corner of said first and second longitudinal edges, said beveled surfaces forming V-shaped troughs when a pair of half members are assembled together for guiding the flow of bonding solvent to join confronting edges of said half members.

6. The luminaire of claim 1 wherein the annular recess at one end of said refractor is formed adjacent the internal surface thereof and the annular recess at the other end is formed adjacent the external surface of said refractor.

7. The luminaire of claim 6 including at least two pairs of said half members assembled together in end-to-end relation with said one end of one pair secured to said other end of said other pair.

8. The combination of claim 7 including annular groove defining means formed on the exterior of said refractor adjacent the junction of said pairs of half members in end-to-end relation for receiving and directing bonding solvent into said annular recess for bonding said pairs together.

9. The luminaire of claim 1 including a light-supporting structure internally of said refractor, first annular sealing means adjacent one end of said refractor and light-supporting structure and second annular sealing means adjacent the opposite end of said refractor.

10. The luminaire of claim 9 including biasing means for biasing one of said sealing means axially of said light-supporting structure into sealing engagement against an end of said refractor.

11. The luminaire of claim 9 including means for moving at least one of said sealing means longitudinally of said light-supporting structure.

12. The luminaire of claim 9 including a supporting post for said light-supporting structure and means movably mounted on said post for supporting one of said annular sealing means and said refractor for movement longitudinally of said post.